(12) United States Patent
Chheda et al.

(10) Patent No.: US 8,750,329 B2
(45) Date of Patent: *Jun. 10, 2014

(54) OPTIMIZED SCHEDULING METHOD FOR DELAY-SENSITIVE TRAFFIC ON HIGH SPEED SHARED PACKET DATA CHANNELS

(75) Inventors: Ashvin Chheda, Plano, TX (US); Rza Nuriyev, Dallas, TX (US); David Paranchych, Richardson, TX (US)

(73) Assignee: Rockstar Consortium US LP, Plano, TX (US)

( * ) Notice: Subject to any disclaimer, the term of this patent is extended or adjusted under 35 U.S.C. 154(b) by 789 days.

This patent is subject to a terminal disclaimer.

(21) Appl. No.: 12/767,887

(22) Filed: Apr. 27, 2010

(65) Prior Publication Data

US 2010/0260047 A1 Oct. 14, 2010

Related U.S. Application Data

(63) Continuation of application No. 11/241,462, filed on Sep. 30, 2005, now Pat. No. 7,715,341.

(60) Provisional application No. 60/648,181, filed on Jan. 28, 2005.

(51) Int. Cl.
*H04J 3/16* (2006.01)

(52) U.S. Cl.
USPC .......................................................... 370/468

(58) Field of Classification Search
None
See application file for complete search history.

(56) References Cited

U.S. PATENT DOCUMENTS

| 6,421,335 | B1 * | 7/2002 | Kilkki et al. ................... 370/342 |
| 6,826,153 | B1 * | 11/2004 | Kroon ............................ 370/235 |
| 7,061,862 | B2 * | 6/2006 | Horiguchi et al. ............. 370/230 |
| 7,197,044 | B1 * | 3/2007 | Kadambi et al. .............. 370/418 |
| 7,366,171 | B2 * | 4/2008 | Kadambi et al. .............. 370/389 |
| 7,623,452 | B2 * | 11/2009 | Roeder ....................... 370/230.1 |
| 7,813,348 | B1 * | 10/2010 | Gupta et al. ................... 370/394 |
| 2003/0135632 | A1 | 7/2003 | Vrzic et al. |
| 2004/0131014 | A1 * | 7/2004 | Thompson, III et al. ..... 370/230 |
| 2004/0160971 | A1 * | 8/2004 | Krause et al. ................. 370/412 |
| 2004/0213152 | A1 * | 10/2004 | Matuoka et al. ............... 370/230 |
| 2005/0068973 | A1 * | 3/2005 | Taffin et al. ................... 370/412 |

FOREIGN PATENT DOCUMENTS

| DE | 19907085 C1 | 4/2000 |
| EP | 1193991 A2 | 4/2002 |
| WO | 2004017650 A2 | 2/2004 |
| WO | 2004047379 A2 | 6/2004 |

OTHER PUBLICATIONS

Bi, Qi, R. Brown, D. Gandhi, C. Huang, and S. Vitebsky; "Performance of 1xEV-DO Third Generation Wireless High-Speed Data Systems;" Lucent Technologies (2003).

(Continued)

*Primary Examiner* — Anh-Vu Ly
(74) *Attorney, Agent, or Firm* — Christopher & Weisberg, P.A.

(57) ABSTRACT

The present invention supports a scheduling protocol on a wireless communication network to transmit data packets stored in a queue from a user. Two performance metrics are generated and summed to provide a priority. The performance metrics are based on the delay for the data packets stored in the queue and the rate that the data packets can be transmitted on the network. The user with the higher calculated priority for the current time slot has its data packets transmitted.

19 Claims, 1 Drawing Sheet

(56) References Cited

OTHER PUBLICATIONS

Bi, Qi, C. Huang, P. Li, and M. Newberry; "Measures of Wireless Data Performance;" Lucent Technologies (2003).
Comaniciu, Cristina, N. Mandayam, D. Famolari, and P. Agrawal; "Wireless Access to the World Wide Web in an Integrated CDMA System;" IEEE (2002).
Gurbuz, Ozgur, H. Owen; "Dynamic Resource Scheduling Schemes for W-CDMA Systems;" IEEE Communications (Oct. 2000).
Bi, Qi; "A Forward Link Performance Study of 1xEV-DO Rev. 0 System using Field Measurements and Simulations;" Lucent Technologies (Mar. 2004).
Langer, Johan and G. Larsson; "CDMA2000—A World View;" Erricson Review No. 3, 2001.
Choi, Young-June and S. Bahk; "Scheduling for VOIP Service in cdma2000 1xEV-DO;" IEEE 2004.
Chen, Xiuzhong, C. Wang, D. Xuan, Z. Li, Y. Min and W. Zhao; "Survey on QoS Management of VOIP;" IEEE 2003.
Agarwal, Anjali; "Quality of Service (QoS) in the New Public Network Architecture;" IEEE Canadian Review, (Fall 2004).
"All-IP IxEV-DO Wireless Data Networks;" Airvana, Inc. 2002.
Written Opinion of the International Searching Authority; EPO; WIPO (Jun. 26, 2006).

* cited by examiner

OPTIMIZED SCHEDULING METHOD FOR DELAY-SENSITIVE TRAFFIC ON HIGH SPEED SHARED PACKET DATA CHANNELS

RELATED APPLICATION DATA

This application is a continuation of U.S. patent application Ser. No. 11/241,462 filed Sep. 30, 2005, which is related to U.S. Provisional Patent Application Ser. No. 60/648,181 filed on Jan. 28, 2005, and priority is claimed for this earlier filing under 35 U.S.C. §120. Applicant further incorporates these prior filings by reference into this utility patent application.

TECHNICAL FIELD OF THE INVENTION

A method for optimizing the scheduler in packet data network to maximize the capacity of delay sensitive traffic.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

Packet-Based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

Current Code Division Multiple Access (CDMA) is an evolving third generation communication system standard for wireless communication systems that can transmit multimedia services using the packet-based Internet protocol. These CDMA mobile communication systems support multimedia telecommunication services delivering voice (VoIP) and data, to include pictures, video communications, and other multimedia information over mobile wireless connections.

As the capability of the various communication standards have improved, there has been an increasing need for high-speed transmissions and increased user capacity. A new CDMA packet air interface has been developed that offers improvements over earlier CDMA systems by implementing high-speed shared-traffic packet data channels on the forward air-link connection. Recent developments include CDMA-based 1×EV systems operating at 1.25 MHz. The 1.25 MHz carrier delivers high data rates and increased voice capacity. 1×EV is a two-phase strategy. One phase is designated 1×EV-DO, which handles data only. The 1×EV-DO standard provides user with peak data rates of 2.4 Mbits/s. The other phase is 1×EV-DV, for data and voice. Other standards are evolving that also make use of the shared packet channel and multiplex packet communication for high-speed data and voice communication.

The common shared packet channel approach used in these standards permits efficient multiplex packet communications to/from applications with bursty traffic. Using the new interface improves downlink transmission speed by ~500%, increases available applications (such as multi-user gaming and downloads of music and films), and increased cell user capacity by ~1000%. Earlier embodiments use a "best effort" operational approach to provide acceptable service for all applications. However, the newer real-time, multimedia, and multicasting applications fail to function adequately under the "best effort" method.

In the high-speed, shared-traffic packet channel systems, packet allocation (e.g. bit and time) requires a packet scheduler. A packet scheduler operates to allocate available resources of time, code, or power to the packet data users, determine bit rate and duration of the allocation, determine the transport channel, monitor the packet allocations and the system loads, allocate the shared channels, and regulate the network load by increasing or decreasing the bit rates. The shared channels use a single orthogonal code shared with other packet users to establish a dedicated channel in a time division approach.

In order to maximize capacity for a fixed outage criterion, the appropriate scheduler must be implemented. In general, delay-sensitive traffic, such as VoIP, possesses certain outage criteria associated with the traffic load in the network. For example, the greater the number of VoIP users that are actively served per sector, the greater the delay in serving the users due to the heavier traffic load and the employed scheduling methodology. Consequently, optimizing the scheduler is important for efficient utilization of the air-link spectrum by a maximum number of users while meeting the pre-defined delay bounds specified by the operator.

As the frame end-to-end delay increases in the system, the quality of service degrades for time sensitive applications such as VoIP. At some point, the system blocks access for new users to ensure that current active users in the system maintain a specified quality of service grade. Several approaches have been used in the past to allocate system resources that have not proven entirely satisfactory.

In the round robin approach, each user with available packets in the buffer is served one at a time. If the user does not have packets in the buffer, then that user is skipped. While no user is left without any allocation, no channel conditions are used for the allocation. Therefore, when a user's turn approaches, irrespective of the channel rate the user can get, the packet scheduler transmits as many bits out of the buffer as possible. However, if the rate scheduled is low due to the channel condition, relatively few bits are transmitted. By the time the user's turn comes around again, the packet delay bound (e.g. QoS criteria) may have been exceeded. Consequently, this type of scheduler cannot maximize the capacity for a give QoS or outage criterion.

In the maximum granted rate approach, the user with the maximum rate is assigned a highest priority. This maximizes the sector throughput and quality for a select few users in good channel conditions. However, the majority of users will not receive adequate resource allocation and capacity will be minimized for a given QoS and outage criterion.

The proportional fair approach scheduler makes allocations based on fairness without attempting to meet a delay bound criterion. The scheduler selects the user with data in the buffer and with the highest priority based on the ratio of R(t)/RR(t); where R(t) is the rate that can currently be granted to the user, and RR(t) is the average rate of the user over a period of time. Therefore, if a user fails to receive adequate allocation for sufficient time, then RR(t) reduces and the ratio of R(t)/RR(t) increases so there is a higher likelihood that the user will be selected. However, the scheduler does not take delay into consideration, so the capacity cannot be maximized for a given QoS or outage criterion.

The proportional plan scheduler is designed to allocate resources by combining proportional fair concepts in addition to delay concepts. However, this method fails to maximize capacity for a given QoS criterion and does achieve any better results than the others described above.

There is a need for a packet scheduler that takes the channel conditions of what one user may observe compared to another user into account to leverage the inherent multi-user diversity that exists with a large pool of users. Such an approach can considerably improve the capacity for a fixed outage criterion.

SUMMARY OF THE INVENTION

The invention uses two essential metrics in combination to schedule allocation of channel resources. The first metric relates to the channel quality that the user observes during the scheduling interval and the second metric is related to the time to expiration of packet(s) for a user stored in the scheduling buffer or queue. Time to expiration is a metric that reflects the amount of time left before the packet would be considered useless, i.e. the mobile's jitter buffer would discard the packet as expired.

There are various permutations of these two essential concepts. Priority is evaluated for every user according to a Priority Update function. The user with the highest priority is chosen and declared as the user to be scheduled. Therefore, specifying priority update function completely determines the particular scheduler.

A packet whose elapsed Time in the Queue (Tq=Current_Time−Arrival_Time) is greater than the pre-set Delay bound (D) is dropped from the user's queue. Time to Expiration (Te) is defined as the amount of time before the packet will be dropped from the queue (Te=D−Tq)

The first option uses the following algorithm:

$$\text{Priority} = K(A) + b*P \qquad 1.$$

where for each user K(A) is the number of packets whose time to expiration is less than A (if traffic mix, we might count only delay-sensitive packets). P is number of complete packets that can be transmitted if the current user is selected (max number of consecutive packets whose combined size is less than the payload for the selected rate for the user). Parameters A and b are to be selected to match the packet arrival characteristics (either fixed or adaptive).

The second option uses the following algorithm.

$$\text{Priority} = \Sigma_A [r^{Te}] + b*P \qquad i.$$

where $\Sigma_A$ operation is the summation over all the packets in the queue whose time to expiration is less than A. Te is the time to expiration as defined above. P is also as defined above. Variables r (which must have a value less than 1), A and b are parameters assigned by the system operator.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
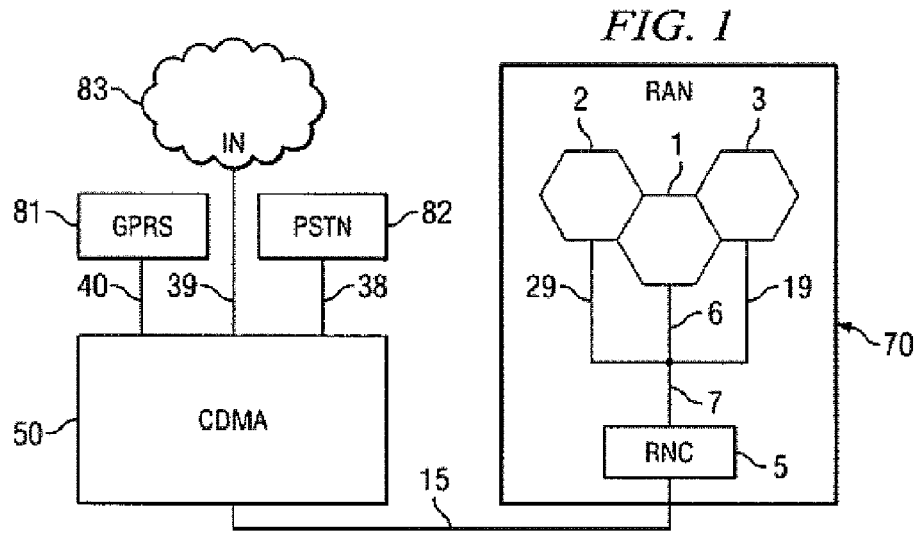
FIG. 1 is a schematic diagram of the functional elements of a wireless communication network utilizing the invention based on an implementing architecture for a CDMA system.

A typical CMDA cellular communication system is comprised of multiple cell sites operating over a geographic region. Referring to FIG. 1, cell site 1 supports wireless communication with mobile stations (e.g. cellular phones, laptop computers, palm pilot devices, etc.) within that cell site service area. Other cell sites 2 and 3 are located next to cell site 1 on FIG. 1, and each cell site 2 and 3 supports wireless communications in their respective areas.

The Radio Network Controller ("RNC") 5 is coupled to the cellular site 1 by signal lines 6 and 7. The RNC 5 is coupled to cellular site 3 via signal line 19 and 7, and the RNC 5 is coupled to cellular site 2 via signal line 29 and 7. The RNC 5 supports the transmission of voice and data communications on the cellular wireless network, and the RNC 5 allows for the continuity of transmissions to and from mobile stations as each mobile station roams the wireless network from one cellular site to another (e.g. cell site 1 to cell site 2). The RNC 5 will also control other components in the cellular sites to further support the transmission of voice and data on the wireless network. The packet scheduler is a functional component of the RNC 5. The RNC 5 allocates system resources of time, code, or power to the packet data users. Collectively, the RNC 5 and its associated components can be called a Radio Access Network ("RAN") 70. The RNC 5 can also be individually referred to as the RAN.

The CDMA network 50 is shown in FIG. 1. Although other implementing architectures for the invention may be used, the preferred embodiment uses a CDMA network 50 or a similar network having an RNC and RN. The RNC 5 unit is coupled to the CDMA system 50 through interface signal line 15. The CDMA system 50 supports the transmission of IP packets, or other types of packeted data, over a communication infrastructure. The CDMA 50 provides packet-based access to a mobile node on the RAN 70 through the communication link 15.

The CDMA 50 is also coupled to other types of networks, such as GPRS 81, a Public Switched Telephone Network (PSTN) 82, and the Internet 83. The CDMA 50 is coupled to the GPRS 81 via communication link 40. The CDMA 50 is coupled to the PSTN 82 via communication link 38, and the CDMA 50 is coupled to the Internet 83 via communication link 39.

A Radio Network (not shown) on cellular site 1 supports a wireless communication from a subscriber, mobile unit user, or a mobile station in the cell site 1 service area. In this manner, a mobile station operating on the cellular site 1 of RAN 70 can communicate on the Internet 83 or the PSTN 82, for example, through the communication link 15 and the CDMA 50.

Figure 2:
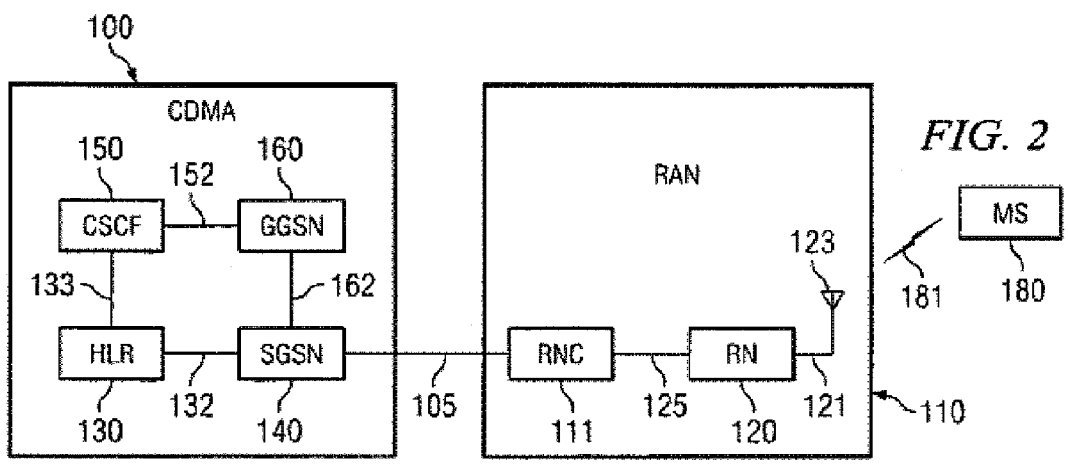
FIG. 2 shows a CDMA implementing architecture showing internal components for CDMA communication system using the invention.

FIG. 2 shows more internal details of the CDMA wireless telecommunications network 100 coupled to a RAN 110 via communication link 105. The communication link 105 is coupled to the RAN 110 through its associated RNC 111. The RNC 111 is in turn coupled to a Radio Network ("RN") 120, supporting wireless communications on a cellular site. The RNC 111 is coupled to the RN 120 via communication line 125. The RN 120 is coupled to an antenna 123 via communication line 121. The antenna supports wireless communications with the mobile station ("MS") 180 via the wireless communication link 181.

The CDMA network 100 comprises a Home Location Register (HLR) 130 coupled to the Serving GPRS Support Node (SGSN) 140 via signal line 132. The GPRS 100 also comprises a Call State Control Function (CSCF) 150 coupled to a Gateway GPRS Support Node (GGSN) 160 via signal line 152. The GGSN 160 is coupled to a SGSN 140 via signal line 162, and the CSCF 150 is coupled to the HLR 130 via signal line 133.

The data transmission between the SGSN 140 and RNC 111 flows through communication link 105 thereby permitting communication between the RAN 110 and the CDMA 100. The CDMA 100 is also coupled to other networks (not shown), such as a PSTN, the Internet, or a GPRS, as described in FIG. 1. The RNC 111 controls the slot cycle operating on the RAN 110 that determines the time slots when packets to and from the MS 180 are transmitted from the storage queue.

Figure 3:
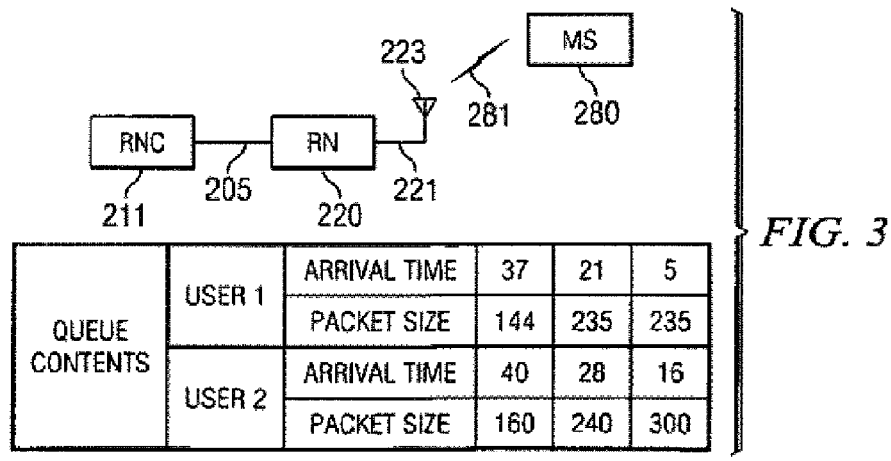
FIG. 3 is a diagram of the communication link between the radio network controller and the mobile station that invention operates within, with a table showing a simple example of a storage queue with packets for two users.

FIG. 3 shows the components of the CDMA network that are the focus of the invention. The RNC 211 is connected to the RN 220 by communication link 205. The RN 220 is coupled to an antenna 223 via communication line 221. The antenna 223 supports wireless communications with the MS 280 via the wireless communication link 181.

Two functional components of the RNC 211 are queuing and scheduling. The CDMA functions by allocating time slots within the bandwidth to transmit packet data. The duration of the time slot cycle is set to provide an acceptable QoS for the various data applications, so that within each cycling of the various slots adequate resources are available to provide acceptable QoS. One standard assigns 100 slots to a 166-millisecond cycle. In theory, up to 100 users can be supported with packet transmissions occurring over a 1.66-millisecond time slot each 166-millisecond cycle. Information packets received during the cycle are stored in queue storage at the RNC 211 until the time for transmission of that assigned time slot elapses within the cycle. The scheduling functionality actually schedules the information packet transmission.

In FIG. 3, the contents of the queue are shown for two users. User 1 has a data packet with an arrival time of 5 (e.g. #5 within the 100 slots) and a size of 235 bits, a data packet with an arrival time of 21 and a size of 235 bits, and a data packet with an arrival time of 37 and a size of 235 bits. User 2 has a data packet with an arrival time of 16 and a size of 300 bits, a data packet with an arrival time of 28 and a size of 240 bits, and a data packet with an arrival time 40 and a size of 160 bits.

Many applications are comparatively much more delay sensitive. Delay-sensitive traffic includes such services as Voice over IP (VoIP), real time video, and audio. The data packets associated with such delay-sensitive services posses different delay bounds with typical values being 100 milliseconds for VoIP, and 800 milliseconds for real time video, resulting in the packets being discarded if the specified delay-bound for transmission is exceeded. Transmission delays greater than the delay bound (e.g. 100 milliseconds) adversely affect the QoS of these services as the information packets' delay bound expires and results in discarded data. For multi-user systems, the QoS criteria will be adversely affected if the scheduling function fails to effectively allocate the time slots and packet loss occurs.

Two options are used in the invention to efficiently prioritize packet transmission to maintain QoS and efficiently utilize the available bandwidth available on a multi-user system. In both options, a two-part performance metric is used in an algorithm corresponding to the following basic mathematical equation:

$$\text{Priority=Delay Metric+Rate Metric}$$

In the first option, the first metric is a delay metric corresponding to the number of packets with a time till expiration less than an operator-designated value, which must be less than the delay bound time. The second metric is a rate metric and corresponds to the number of complete packets that the current packet payload can accommodate if that user is chosen. These two metrics are used to compute and assign a priority value according to the following priority function algorithm:

$$P(f)=K(A)+b*P$$

K(A)=number of packets whose time to expiration is less than A.

P=number of packets that can be transmitted if the current user is selected.

A and b are selected to match the packet arrival characteristics, and may be either fixed or adaptive.

Considering User 1 and User 2 in FIG. 3, A is specified with a value of 25 slots, Current time is set as $50^{th}$ slot, Delay bound is set equal to a duration of 50 slots, b is set with a value of "1", and the number of bits that can be transmitted is 480 for both users. That is, the total size of the packet transmitted in the CDMA is 512-bits, with 32-bits devoted to data overhead leaving 480-bits that can be included in the payload of a transmitted packet. With these parameters, time to expiration for packets is the same as time of arrival [Texp=Delay Bound−(Tcurrent−Tarrival)]. For User 1 and User 2, the algorithm translates as follows:

| | |
|---|---|
| User 1 | P(f) = 2 + 2 = 4 |
| User 2 | P(f) = 1 + 1 = 2 |

Because User 1 has a higher priority, an information packet containing 480 bits of data from the data packets stored for User 1 is generated and transmitted.

For the second option, a two part metric is also used in an algorithm. The first metric is a delay metric computed by summing a fractional computation derived using the time till expiration of all the packets in the queue for a user. The second metric is a rate metric and corresponds to the number of complete packets that the current packet payload can accommodate if that user is chosen. These two metrics are used to compute and assign a priority value according to the following priority function algorithm:

$$P(f)=\Sigma_A[r^{Te}]+b*P \qquad \text{i.}$$

Te=amount of time before the packet will expire and dropped from the queue.

P=number of packets that can be transmitted if the current user is selected.

r, A and b are parameters defined by the operator, where r<1.

Considering User 1 and User 2 in FIG. 3, r is assigned a value of 0.95, A is set at 25 slots, Delay bound is set at 50 slots, Current Time is $50^{th}$ slot, b is set with a value of "1", and the number of bits that can be transmitted is 480 for both users. That is, the total size of the packet transmitted in the CDMA is 512-bits, with 32-bits devoted to data overhead leaving 480-bits that can be included in the payload of a transmitted packet. For User 1 and User 2, the algorithm translates as follows:

User 1 $P(f)=\Sigma[0.95^5+0.95^{21}]+2=(0.774+0.341)+2=3.115$

User 2 $P(f)=\Sigma[0.95^{16}]+1=(0.440)+1=1.440$

Because User 1 has a higher priority, an information packet containing 480 bits of data from the data packets stored for User 1 is generated and transmitted.

Other mathematical permutations are possible using performance metrics. The essential core element of the invention is using at least one performance metric, in this case both a delay and rate metric, to calculate and assign a priority to a user for transmitting as many data packets for the user presently stored in the queue (as permitted by the allowable packet payload size) according to the basic mathematical equation of Priority=Performance Metric.

While the invention has been particularly shown and described with respect to preferred embodiments, it will be readily understood that minor changes in the details of the invention may be made without departing from the spirit of the invention. For example, the rate metric can be taken to be not only the complete number of packets that fit in the payload, but number of complete packets plus the ratio of number of the bits of the last packet that fit into payload to the total size of the last incomplete packet. Also, in the second version of the delay metric, instead of $r^{Te}$ function any decreasing function of parameter Te can be used.

Having described the invention, we claim:

1. A packet-based wireless communication system, comprising:
    a scheduler configured to schedule transmission of information packets, each information packet comprised of at least one data packet, by assigning a priority generated from an algorithm which uses at least one performance metric for each data packet in a queue for transmission to a plurality of terminals, said at least one performance metric based at least in part on a number of packets whose time to expiration is less than a threshold; and
    a transmitter configured to transmit information packets to a plurality of terminals, said transmitter being connected to the scheduler for sequentially transmitting information packets in the queue to the terminals according to the assigned priority.

2. The packet-based wireless communication system of claim 1 wherein the at least one performance metric comprises a rate metric computed based on a size of an information packet payload.

3. The packet-based wireless communication system of claim 1 wherein the algorithm comprises a first performance metric and a second performance metric.

4. The packet-based wireless communication system of claim 3 wherein the first performance metric comprises a delay metric computed based on the time to expiration of a data packet.

5. The packet-based wireless communication system of claim 3 wherein the second performance metric comprises a rate metric computed based on a size of an information packet payload.

6. The packet-based wireless communication system of claim 1 wherein the algorithm adds the value of a first performance metric to a second performance metric as part of the priority assignment generation.

7. The packet-based wireless communication system of claim 6 wherein the algorithm establishes a priority based on the sum of the first performance metric and the second performance metric, wherein the first performance metric is a delay metric and the second performance metric is a rate metric.

8. The packet-based wireless communication system of claim 7 wherein:
    the delay metric is calculated using the time to expiration of a data packet; and
    the rate metric is calculated based on a projected size of an information packet payload.

9. The packet-based wireless communication system of claim 1, wherein the at least one performance metric is exponentially related to a time of expiration of a packet.

10. A method for assigning a time slot within a time slot cycle in a packet-based communication network, comprising the steps of:
scheduling transmission of an information packet by assigning a priority to a user of the network, said priority generated by an algorithm using at least one performance metric for each packet stored in a queue for said user, said performance metric based at least in part on a number of packets whose time to expiration is less than a threshold;
assembling said information packet from at least one data packet in said queue for said user; and
transmitting said information packet.

11. The method for assigning a time slot within a time slot cycle in a packet-based communication network of claim 10, further comprising the step of:
calculating the priority using the sum of a first performance metric and a second performance metric.

12. The method for assigning a time slot within a time slot cycle in a packet-based communication network of claim 11, further comprising the step of:
generating the second performance metric based on the number of data packets stored in the queue for a user that can be transmitted in an assembled information packet.

13. The method for assigning a time slot within a time slot cycle in a packet-based communication network of claim 11, wherein the first performance metric is a delay metric.

14. The method for assigning a time slot within a time slot cycle in a packet-based communication network of claim 11, wherein the second performance metric is a rate metric.

15. The method for assigning a time slot within a time slot cycle in a packet-based communication network of claim 10, wherein the at least one performance metric is exponentially related to a time of expiration of a packet.

16. A method of packet-based wireless communication comprising the steps of:
providing a queue that stores data packets, said queue controlled by a radio network controller,
storing data packets for a user in the queue;
assigning a priority for a user to allocate system resources, said priority generated from an algorithm which uses at least one performance metric for each data packet in a queue for transmission to a plurality of terminals, said at least one performance metric based at least in part on a number of packets whose time to expiration is less than a threshold;
sequentially transmitting one or more data packets for a user with the highest priority in a current time slot, using a first performance metric and a second performance metric; and
calculating said second performance metric based on the number of data packets for a user that can be transmitted in an information packet for the current time slot.

17. The method of packet-based wireless communication of claim 16, further comprising the step of:
calculating said first performance metric based on time to expiration of data packets for a user stored in said queue.

18. The method of packet-based wireless communication of claim 17, wherein said priority is generated by an algorithm summing the first performance metric and the second performance metric.

19. The method of packet-based wireless communication of claim 16, wherein the at least one performance metric is exponentially related to a time of expiration of a packet.

* * * * *